United States Patent [19]

Ruehl

[11] Patent Number: 4,620,070
[45] Date of Patent: Oct. 28, 1986

[54] TELEPHONE LINE TESTER

[75] Inventor: William E. Ruehl, Wheeling, Ill.

[73] Assignee: Illinois Tool Works Inc., Chicago, Ill.

[21] Appl. No.: 698,070

[22] Filed: Feb. 4, 1985

[51] Int. Cl.$^4$ .............................................. H04B 3/46
[52] U.S. Cl. ........................ 179/175.3 R; 179/175.3 F
[58] Field of Search ................... 179/175.3 R, 175.3 F, 179/175, 175.1 R; 324/133

[56] References Cited
U.S. PATENT DOCUMENTS
4,564,728  1/1986  Romano .................. 179/175.3 F X

*Primary Examiner*—Stafford D. Schreyer
*Attorney, Agent, or Firm*—A. J. Brunett; J. P. O'Brien; T. W. Buckman

[57] ABSTRACT

A telephone line tester comprises a tester body having a connector portion of complementary configuration for insertion into a modular telephone jack; a light emitting element having a light body and a pair of elongate leads extending outwardly of the light body; guides in said tester body for guiding the elongate leads to and across the connector portion to a position for engagement with tip and ring contacts respectively of the modular telephone jack when the connector portion is inserted into the modular telephone jack. Preferably, the light emitting element comprises a bipolar LED adapted to emit a first color of light in response to a voltage of a first polarity thereacross and a second color of light in response to a voltage of opposite polarity thereacross, and to emit no light in response to substantially no voltage thereacross. The invention also contemplates a method of forming a telephone line tester of the foregoing type.

14 Claims, 6 Drawing Figures

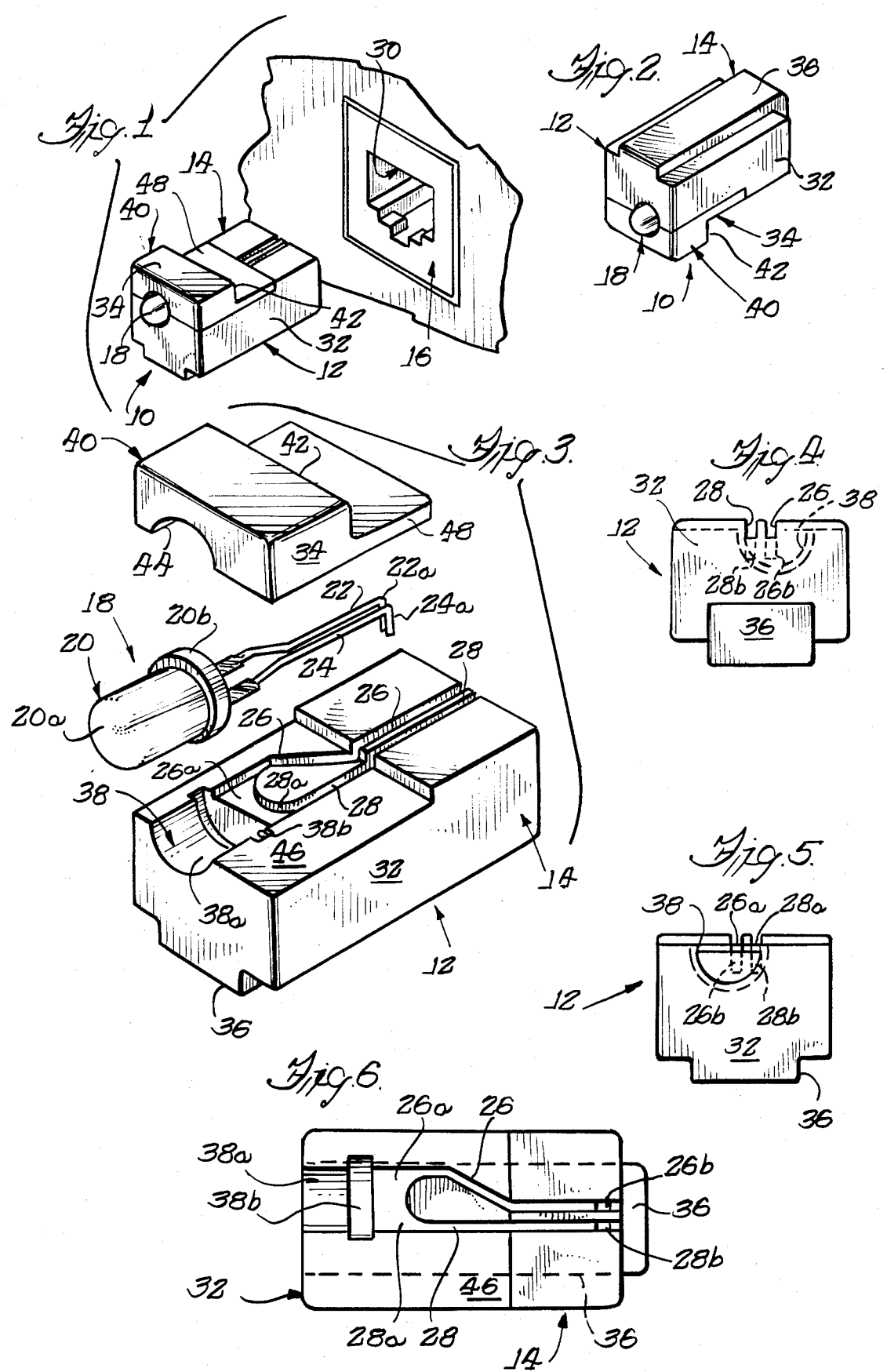

TELEPHONE LINE TESTER

BACKGROUND OF THE INVENTION

This invention is directed generally to telephone line test apparatus and more particularly to a phone line tester for interfitting with a modular telephone jack for testing the tip-ring polarity of the modular telephone jack.

Briefly, modular telephone equipment currently in use utilizes a wall-mounted receptacle comprising a modular telephone "jack" or socket capable of accepting a complementary modular telephone plug. This plug can be readily disconnected and connected to another similar modular jack or receptacle in another location. Certain telephone equipment further requires that the terminals or contacts of each receptacle or modular maintain a predetermined tip-ring, that is, positive-to-negative polarity with respect to the central office equipment. It is, however, possible that such receptacles may inadvertently be miswired and that the final tip-ring polarity of the contacts could be wired in reverse polarity. Moreover, it is possible that one of the tip or ring lines leading to the contacts may be inadvertently broken, disconnected or improperly connected to a terminal or contact other than the proper tip or ring terminal or contact.

Accordingly, it is a general object of the invention to provide a telephone line tester for quickly and easily testing for the proper tip ring polarity of such a modular telephone jack or wall-mounted receptacle.

Broadly speaking, the concept of testing the tip-ring polarity of telephone receptacles or modular jacks is known, as shown for example in U.S. Pat. No. 4,209,671 Charles et al. and U.S. Pat. No. 4,373,120 to McDonald. The devices of both of these patents utilize as an indicator a lamp or other light-emitting element of a type which requires that a further polarity sensitive element, such as a diode, be additionally coupled across the tip-ring lines during testing. This is required in order to complete the circuit and/or to assure that only the proper polarity of the tip-ring voltage will cause the indicator lamp or other element to light.

Moreover, the device of the Charles, et al. patent further includes a battery for testing the modular jack even in the absence of a connection thereof to the central office. Hence, this battery replaces the tip-ring voltage normally provided from the central office or other outside equipment. Accordingly, the device of Charles, et al. can test only the continuity or proper connection of the tip-ring lines, and not the presence and proper polarity of the tip-ring voltage from the central office. This device further requires that the additional polarity-sensitive element or diode be coupled to the line at some point removed from the modular jack or receptacle being tested. For example, the diode is to be connected near a station protector located near the entrance of the phone line to the subscriber's location or even back at the central office.

The McDonald patent additionally requires that a resistor element of a predetermined value be coupled in circuit with the diode and neon tube indicator so as to provide a characteristic "signature" or signal. This signal is recognizable by the telephone central office equipment for purposes of making a continuity test on a subscriber line from the central office. Hence, the McDonald patent does not necessarily contemplate on-site testing of the equipment or of the modular jack.

OBJECTS AND SUMMARY OF THE INVENTION

Accordingly, it is a general object of the invention to provide a novel and improved telephone line tester.

A more specific object is to provide a telephone line tester which is capable of providing an indication of the presence or absence of a tip-ring voltage, as well as the polarity of the voltage without requiring the connection of further circuit elements across the tip-ring lines.

A related object is to provide a telephone line tester in accordance with the foregoing objects which is relatively simple and inexpensive in its design and manufacture and yet highly reliable in operation.

A further related object is to provide a method for constructing a telephone line tester in accordance with the foregoing objects.

Briefly, and in accordance with the foregoing objects, a telephone line tester in accordance with the invention comprises a tester body having a connector portion of complementary configuration for insertion into a modular telephone jack; light emitting means having a body and a pair of elongate leads extending outwardly of said body, said light emitting means being mounted to said tester body; and guide means in said tester body for guiding said elongate leads to and across said connector portion to a position for engagement with tip and ring contacts of said modular telephone jack when said connector portion is inserted into said modular telephone jack.

In accordance with another aspect of the invention, said light emitting means comprises a bipolar LED adapted to emit a first color of light in response to a voltage of a first polarity thereacross and a second color of light in response to a voltage of opposite polarity thereacross, and to emit no light in response to substantially no voltage thereacross.

In accordance with a further aspect of the invention, there is provided a method of forming a telephone line tester of the foregoing type.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is an exploded perspective view illustrating a telephone line tester in accordance with the invention in conjunction with a modular telephone jack;

FIG. 2 is a bottom perspective view of the telephone line tester of the invention;

FIG. 3 is an enlarged exploded perspective view of the telephone line tester of the invention;

FIG. 4 is a rear elevation of a first body portion of the telephone line tester of the invention;

FIG. 5 is a front elevation of the body portion of FIG. 4; and

FIG. 6 is a top plan view of the body portion of FIGS. 4 and 5.

DETAILED DESCRIPTION OF THE ILLUSTRATED EMBODIMENT

Referring now to the drawings, and initially to FIG. 1 a telephone line tester in accordance with the invention is designated generally by reference numeral 10. This tester or test apparatus 10 comprises a tester body 12 having a connector portion 14 of complementary configuration for insertion into a modular telephone jack designated generally by reference numeral 16. This connector portion 14 is defined generally at a leading edge of the body 12 with respect to the direction of its insertion into telephone jack 16 as viewed in FIG. 1.

In accordance with the invention, the tester 10 is adapted for testing the tip-ring polarity of the modular telephone jack 16. To this end, light emitting means which in the illustrated embodiment comprises a light emitting diode (LED) 18 is provided. As best viewed in FIG. 3, the light emitting means or LED 18 has a light or LED body 20 and a pair of elongate leads 22 and 24 extending outwardly of the light or LED body. Cooperatively, guide means comprising grooves or recesses 26 and 28 are provided in the tester body 12 for receiving and guiding the elongate leads 22 and 24 to and across the connector portion 14 of the tester body 12.

These grooves or guide means 26 and 28 guide the leads 22 and 24 into position for engagement with tip and ring contacts respectively of the modular telephone jack 16 when the connector portion 14 is inserted into the telephone jack 16. These tip and ring contacts are located interiorly of the modular telephone jack 16 on an upper surface thereof as oriented in the view of FIG. 1, as generally indicated by reference numeral 30. Accordingly, elongate leads 22 and 24 and grooves 26 and 28 together define coupling means for coupling the LED across the tip and ring contacts of the modular telephone jack 16 to thereby place the tip-ring voltage, if any, across the light emitting means or LED 18.

In accprdance with a preferred form of the invention, the light emitting means or LED 18 comprises a bipolar LED adapted to emit a first color of light (preferably green) in response to a voltage of the desired polarity thereacross and a second color of light (preferably red) in response to a voltage of the opposite or reversed polarity thereacross. The bipolar LED 18 will emit no light when there is substantially no voltage thereacross. It will be appreciated, that by observing the condition of LED 18 when inserted into modular telephone jack 16, one may determine not only the presence or absence of a voltage across the tip and ring contacts of jack 16, but also the positive-to-negative polarity of any voltage present thereacross.

In the illustrated embodiment, the tester body 12 comprises a first or lower body portion 32 on which is formed the connector portion 14, and a second or upper body portion 34. The first body portion hence has a complementary cross-sectional configuration to that of the modular telephone jack, including a raised, generally rectilinear ridge portion 36 which extends across a bottom surface and toward the leading end thereof as best viewed in FIGS. 2 and 4. A trailing end of first body portion 32 further includes a recess 38 of complementary configuration for receiving a portion of the LED body 20.

In this regard, the LED body includes a generally translucent protruding portion 20a and a generally annular, radially outwardly extending rim portion 20b from which the translucent member or portion 20a extends axially. Accordingly, the recess 38 includes recess portions 38a and 38b of complementary configuration for receiving respectively translucent body portion 20a and annular rim portion 20b. In this regard, recess 38 opens to the trailing surface of body portion 32 with respect to its direction of insertion into the jack 16 in FIG. 1, to permit viewing of the translucent portion 20a.

The tester body 12 further includes stop means 40 for defining a fully inserted position of the connector portion 14 with respect to the jack 16. In the illustrated embodiment, this stop means or portion 40 is defined on the second or upper body portion 34 and comprises a generally outwardly projecting portion thereof which defines an outwardly projecting abutment surface 42.

Moreover, the upper body portion 34 also has a recess 44 therein which is of complementary configuration for receiving the remaining or remnant portion of the LED body 20 therein. In this regard, the recess 44 is substantially identical in configuration to recess 38, so that each recess receives substantially one-half of the LED body 20 therein. Recess 44 also opens outwardly of upper body portion 34 substantially coplanar with the open end of recess 38 to expose at least a portion of the LED body 20 for viewing.

It will be noted that guide means or grooves 26, 28 each have an open end, 26a, 28a in communication with the recess 38 for receiving the leads 22, 24 of the LED 18. These grooves 26 and 28 thereafter extend, as previously indicated across the connector portion 14 of the tester body 42 to guide the leads into position for making contact with the tip and ring contacts of the jack 16. Moreover, the grooves 26, 28 further preferably include inwardly extending recess portions 26b, 28b adjacent a leading end of the body 32, as best viewed in FIG. 6, for receiving and holding downwardly directed end portions 22a and 24a of leads 22 and 24 of the LED 18.

In the illustrated embodiment, the first or lower body portion 32 includes a step-down or cut-out section or portion 46 generally following the connector portion 14 thereof for receiving the second or upper body portion 40 therein. In this regard, the second body portion 40 includes a first section 48 for interfitting with the cut-out section 46 in a substantialy flush condition with the connector portion 14 so as to generally form a continuation thereof. The previously mentioned outwardly projecting portion 40 and abutment surface 42 thereof comprise a second section of the upper body portion 34 which projects laterally outwardly from this first section 48.

While particular embodiments of the invention have been shown and described in detail, it will be obvious to those skilled in the art that changes and modifications of the present invention, in its various aspects may be made without departing from the invention in its broader aspects, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. A telephone line tester comprising: a tester body having a connector portion of complementary configuration for insertion into a modular telephone jack; a bipolar LED an LED body and a pair of elongated leads extending outwardly from said LED body; coupling means for effecting electrical connection of said LED across tip and ring contacts of said modular telephone jack when said tester body is inserted therein; said coupling means having said elongate leads and guide means in said tester body for guiding said elongate leads to and across said connector portion to a predetermined position for engagement with said tip and ring contacts respectively when said connector portion is inserted into said modular telephone jack; and stop means on said tester body for defining a fully inserted position of said connector portion relative to said modular telephone jack said bipolar LED being adapted to emit a first color of light in response to a voltage of one polarity thereacross and a second color of light in response to a voltage of the opposite polarity thereacross, and to emit no light in response to substantially no voltage thereacross.

2. A telephone line tester according to claim 1 wherein said tester body comprises a first body portion of a complementary cross-sectional configuration to the cross-sectional configuration of said modular telephone jack and a recess therein of complementary configuration for receiving at least a portion of said LED body, and a second body portion for interfitting with said first body portion and having a outwardly projecting abutment surface comprising said stop means.

3. A telephone line tester according to claim 2 wherein said guide means comprises a pair of grooves each having an open end in communication with said LED-receiving recess and extending across said connector portion of said tester body.

4. A telephone line tester according to claim 2 wherein said second body portion has a recess therein alignable with said first body portion recess and of complementary configuration for receiving a remnant portion of said LED body.

5. A method of forming a telephone line tester comprising: providing a tester body having a connector portion of complementary configuration for insertion into a modular telephone jack; providing a light emitting element comprising a light body and a pair of elongate leads extending outwardly of said light body; and providing guide means in said tester body for guiding said elongate leads of said light emitting element to and across said connector portion thereof to a position for engagement with tip and ring contacts respectively of said modular telephone jack when said connector portion is inserted into said modular telephone jack.

6. A method according to claim 5 and further including providing stop means on said tester body for defining a fully inserted position of said connector portion thereof relative to said modular telephone jack.

7. A method according to claim 5 and further including the step of forming recess means in said tester body of complementary configuration for receiving said light body.

8. A telephone line tester comprising: a tester body having a connector portion of complementary configuration for insertion into a modular telephone jack; light emitting means mounted to the tester body and having a light body and a pair of elongate leads extending outwardly of said light body; guide means in said tester body for guiding said elongate leads to and across said connector portion to a position for engagement with tip and ring contacts respectively of said modular telephone jack when said connector portion is inserted into said modular telephone jack.

9. A telephone line tester according to claim 8 wherein said light emitting means comprises a bipolar LED adapted to emit a first color of light in response to a voltage of a first polarity thereacross and a second color of light in response to a voltage of opposite polarity thereacross, and to emit no light in response to substantially no voltage theracross.

10. A telephone line tester according to claim 8 and further including stop means on said tester body for defining a fully inserted position of said connector portion relative to said modular telephone jack.

11. A telephone line tester according to claim 10 wherein said tester body comprises a first body portion of complementary cross-sectional configuration to the cross-sectional configuration of said modular telephone jack and having a recess therein of complementary configuration for receiving at least a portion of said light body therein, and a second body portion for interfitting with said first body portion and having an outwardly projecting abutment surface comprising said stop means.

12. A telephone line tester according to claim 11 wherein said second body portion has a recess therein alignable with said first body portion recess and of complementary configuration for receiving a remnant portion of said light body.

13. A telephone line tester according to claim 11 wherein said first body portion includes a cut-out section following said connector portion thereof for receiving said second body portion therein, said second body portion including a first section for interfitting with said cut-out section in a substantially flush condition with said connector portion to form a continuation thereof and a second section comprising said outwardly projecting abutment surface, which projects laterally outwardly from said first section.

14. A telephone line tester according to claim 12 wherein said recesses of said first and second body portions are located for exposing at least a portion of said light emitting means for viewing of the lighted or unlighted condition thereof.

* * * * *